United States Patent
Sugita et al.

(10) Patent No.: US 6,886,984 B2
(45) Date of Patent: May 3, 2005

(54) BEARING DEVICE FOR INTERNAL COMBUSTION ENGINES

(75) Inventors: Mitsuru Sugita, Inuyama (JP); Yukihiko Kagohara, Inuyama (JP); Osamu Ishigo, Inuyama (JP); Yoshikazu Mizuno, Inuyama (JP); Hiroshi Munetoki, Ikeda (JP); Ryouhei Kusunoki, Ikeda (JP); Takashi Shiota, Ikeda (JP); Ichie Nomura, Tokai (JP); Naoki Iwama, Tokai (JP); Hidehisa Kato, Tokai (JP); Tomoyuki Uemura, Tokai (JP)

(73) Assignee: Daido Metal Company Ltd., Nagoya (JP)

( * ) Notice: Subject to any disclaimer, the term of this patent is extended or adjusted under 35 U.S.C. 154(b) by 115 days.

(21) Appl. No.: 10/609,085

(22) Filed: Jun. 27, 2003

(65) Prior Publication Data
US 2004/0052438 A1 Mar. 18, 2004

(30) Foreign Application Priority Data
Jun. 27, 2002 (JP) .......................................... 2002-187076

(51) Int. Cl.$^7$ ................................................ F16C 9/02
(52) U.S. Cl. ...................................... 384/294; 384/912
(58) Field of Search ................................ 384/294, 912, 384/913; 428/653; 148/415–417

(56) References Cited

U.S. PATENT DOCUMENTS

| 4,471,030 A | * | 9/1984 | Fukuoka et al. ............. 384/912 |
| 5,536,587 A | * | 7/1996 | Whitney, Jr. ................. 384/912 |
| 6,712,914 B2 | * | 3/2004 | Suzuki et al. ................ 148/333 |

FOREIGN PATENT DOCUMENTS

| GB | 2 121 435 A B1 | 12/1983 |
| GB | 2 358 872 A B1 | 8/2001 |

OTHER PUBLICATIONS

International Search Report, 4 pages.

* cited by examiner

Primary Examiner—Thomas R. Hannon
(74) Attorney, Agent, or Firm—Rader, Fishman & Grauer PLLC

(57) ABSTRACT

A bearing device for internal combustion engines, comprising a crankshaft of an internal combustion engine and bearings supporting the crankshaft, and wherein the crankshaft is made of steel having not been subjected to surface hardening and having a structure, which is mainly composed of pearlite having the pro-eutectoid ferrite fraction of at most 3%, and is processed to have the surface roughness Rz of at most 0.8 $\mu$m, and wherein the bearings have an aluminum bearing alloy bonded to a back plate thereof and contain, as an alloy component thereof, at least Si particles of less than 4 mass %, whereby early abrasion and scratches of the crankshaft are suppressed to be equivalent to or less than abrasion loss and scratches of conventional DCI shafts.

20 Claims, 4 Drawing Sheets

FERRITE FRACTION AND SCRATCH EVALUATION POINT RATE
(AMOUNT OF MIXED FOREIGN MATTERS 10mg)

RELATIONSHIP AMONG SHAFT, BEARING ALLOY HARDNESS, AND SHAFT ABRASION

INFLUENCE OF BEARING SURFACE LAYER ON SHAFT ABRASION

SHAFT ABRASION

AMOUNT OF Si IN BEARING ALLOY AND SHAFT ROUGHNESS VARIATION RATIO

BEARING DEVICE FOR INTERNAL COMBUSTION ENGINES

CROSS-REFERENCE TO RELATED APPLICATIONS

This application claims priority based on Japanese Patent Application No. 2002-187076, filed Jun. 27, 2002, the entirety of which is incorporated herein by reference.

BACKGROUND OF THE INVENTION

The present invention relates to a bearing device for internal combustion engines of automobiles or the like, comprising a crankshaft and bearings supporting the crankshaft in an internal combustion engine, and more particular, to a bearing device for internal combustion engines, in which a crankshaft having not been subjected to surface hardening such as induction hardening or the like, and bearings are combined with each other.

BACKGROUND ART

Conventionally, in a combination of a crankshaft and bearings (including main bearings and connecting rod bearings) in internal combustion engines of automobiles or the like, steel crankshafts (referred below to as "hardened steel shaft") having been subjected to surface hardening such as induction hardening or the like, and shafts made of spheroidal graphite cast iron (referred below to as "DCI shaft") have been used as materials for constitution of a crankshaft, and bearings for respective shafts have been proposed to be put to practical use.

Hereupon, hardened steel shafts are expensive and involve a disadvantage that cutting chips become continuous and spiral in cutting work. Meanwhile, while DCI shafts are inexpensive and involve an advantage that machinability is good, they are low in Young's modulus, so that in the case where the same load as that on hardened steel shafts is applied, vibrations and noise become large to necessarily involve a disadvantage that an increase in shaft diameter is caused when it is tried to maintain a capability comparable to that of hardened steel shafts.

Therefore, development has been recently taken place to use, as crankshafts, non-temper free-cutting steel having an equivalent Young's modulus to that of hardened steel shafts and an excellent machinability, but conventional non-temper free-cutting steel involves a problem that foreign matters contained in a lubricating oil are liable to cause scratches on surfaces of crankshafts.

BRIEF SUMMARY OF THE INVENTION

Hereupon, the invention has been thought of to propose an optimum combination of a crankshaft and bearings in the case where non-temper free-cutting steel having not been subjected to surface hardening such as induction hardening or the like is used for crankshafts. That is, the invention has been thought of in view of the above circumstances, and has its object to provide a bearing device comprising a combination of a crankshaft, for which surface hardening is omitted, and bearings, and capable of ensuring reliability and productivity.

To attain the above object, there is provided a bearing device for internal combustion engines, comprising a crankshaft and bearings supporting the crankshaft in an internal combustion engine, and wherein the crankshaft is made of steel having not been subjected to surface hardening and having a structure, which is mainly composed of pearlite having the pro-eutectoid ferrite fraction of at most 3%, and is processed to have the surface roughness Rz of at most 0.8 µm, and wherein the bearings have an aluminum bearing alloy joined to a back plate thereof and contain, as an alloy component thereof, at least Si particles of less than 4 mass % (the invention according to first aspect).

Crankshaft are fabricated from steel not subjected to surface hardening such as induction hardening or the like and having a structure, which is mainly composed of pearlite having the pro-eutectoid ferrite fraction of at most 3%, whereby precipitation of a ferrite structure having a low hardness is suppressed and thus possible minute scratches on the ferrite structure, caused by foreign matters contained in a lubricating oil and hard particles in a bearing alloy are prevented from growing into giant scratches to lead to an increase in abrasion loss. The relationship between the ferrite fraction and scratching will be described in more detail with reference to FIG. 1. FIG. 1 is a graph showing the relationship between the ferrite fraction and the scratch evaluation point rate in the case where an amount of mixed foreign matters were 10 mg under test conditions indicated in TABLE 1. The scratch evaluation point is obtained by that a scratch depth of each of the scratches is measured so that each of the scratches is weighted with respective evaluation score varying in accordance with the scratch depth as shown table 2, and subsequently the individual evaluation scores of the scratches are summed to obtain the scratch evaluation point of the scratches. Also, the scratch evaluation point rate is one in the case where scratch evaluation points in a combination of a DCI shaft having adequate achievements as crankshafts for internal combustion engines and an aluminum bearing alloy are used as denominator. Accordingly, when the scratch evaluation point rate is over 1, it is meant thereby that the scratch evaluation point is high as compared with conventional DCI shafts having achievements and a concerned crankshaft is inferior to such DCI shafts, and conversely, when the scratch evaluation point rate is below 1, the scratch evaluation point is low and a concerned crankshaft is equivalent or superior to such DCI shafts. In addition, an aluminum bearing alloy of Al-2.3Si-12Sn-1Cu (mass %) was used for bearings.

TABLE 1

| Foreign matter test | Condition |
| --- | --- |
| Peripheral speed | 0 ↔→ 1.7 m/s |
| Test load | 4 MPa |
| Test time | 20 hrs (start-up - stoppage cycle 4 sec) |
| Lubricating oil | VG10 |
| Foreign matters | JIS kind 2 |
| Evaluation method | Change in irregular configuration of shaft surface |

TABLE 2

| | Weighted evaluation of scratch depth | | | |
| --- | --- | --- | --- | --- |
| Scratch depth | Below 0.8 µm | Below 1.4 µm | Below 2.0 µm | Below 2.6 µm |
| Evaluation Score | 0 | 1 | 2 | 4 |

Then, the ferrite fraction with the scratch evaluation point rate being below 1 is substantially 3% or less. Accordingly, crankshafts are desirably to have the ferrite fraction of 3% or less. Also, when the pro-eutectoid ferrite fraction is over 3%, a ferrite structure is increased to cause much scratching by foreign matters, which finally leads to seizure on bearings. Also, when the surface roughness Rz is over 0.8 μm, early abrasion increases to finally lead to seizure on bearings in some cases.

Meanwhile, in the case where an amount of silicon (referred below to as "Si") in an aluminum bearing alloy of bearings is less than 4 mass %, an attack of Si particles against crankshafts is suppressed, so that early abrasion and scratching of crankshafts are restricted to be equivalent to or less than abrasion loss and scratching of conventional DCI shafts. An amount of Si is preferably less than 4 mass %, and desirably 0.5 to 3.5 mass %. Provided that an amount of Si is in such range, a concerned combination becomes superior to a combination of a conventional DCI shaft and bearings in terms of abrasion loss.

Also, Si particles of less than 4 mass % contained in the aluminum bearing alloy have a feature in that Si particles having the particle diameter of at most 4 μm have the area ratio of at least 60% relative to a total area of Si particles present on a sliding surface (the invention according to second aspect). In the relationship between the particle diameter and area ratio of Si particles in the aluminum bearing alloy, when Si particles are large in particle diameter and large in area ratio, abrasion loss as well as scratching is also increased as compared with those of conventional DCI shafts. Accordingly, since Si particles having the particle diameter of at most 4 μm are set to have the area ratio of at least 60% relative to a total area of Si particles present on a sliding surface, Si particles are restricted to cause abrasion loss and scratching, which are equivalent to or less than those of conventional DCI shafts. In addition, the area ratio of Si particles is calculated on the basis of results of measurement obtained by using an image analysis apparatus to analyze a photomicrograph of a sliding surface and measuring particle diameters of all Si particles present in an area of 0.0125 mm². Particle diameters of Si particles mean diameters of circles having the same areas as those obtained by measuring areas of respective particles.

The aluminum bearing alloy has a feature in that it has a Vickers hardness of at most 70 (the invention according to third). Since an attack of Si particles against crankshafts is abruptly increased when the hardness of the bearing alloy is over a Vickers hardness of 70, the hardness of the bearing alloy must be set at the Vickers hardness of 70 or less. In addition, the Vickers hardness is in some cases referred to as Hv hardness.

Also, the aluminum bearing alloy has a feature in that it has a Vickers hardness (Hv hardness) to meet the formula [$B \leq (S/2-70)$] (B: Hv hardness of the aluminum bearing alloy, S: Hv hardness of the crankshaft) (the invention according to fourth aspect)]. As shown in FIG. 2, when the relationship among crankshafts of the invention being different in hardness, aluminum bearings of the invention being different in hardness and shaft abrasion loss is compared with the relationship among conventional DCI shafts, bearings and shaft abrasion loss, combinations demonstrating excellent capabilities are indicated by ●, combinations demonstrating comparable capabilities are indicated by ○, and combinations demonstrating inferior capabilities are indicated by ▲. Regions of ●, ○, and ▲ can be substantially definitely distinguished from one another. A line (A—A line indicated by a broken line in FIG. 2) partitioning the distinguishable regions is represented by a formula $B=(S/2-70)$, a region above the line is one, in which excellent capabilities are demonstrated as compared with conventional DCI shafts, and a region below the line is one, in which shaft abrasion loss is comparable to that in conventional combinations. Accordingly, $B \leq (S/2-70)$ corresponds to a desirable region. However, since workability of shafts is worsened when a value of the shaft hardness S of a crankshaft is over a Vickers hardness of 280, an upper limit of the shaft hardness S is desirably set to Vickers hardness of 280 or less.

Further, a conforming layer formed from softer plating or resin coating than the aluminum bearing alloy covers surfaces of the alloy (the inventions according to fifth and sixth aspects). Pb and Sn alloy are used for plating, and a resin liquid obtained by blending a solid lubricant and hard particles with a base resin is used as a coating agent in resin coating. For example, in the case where shaft abrasion loss in a combination of a crankshaft and bearings with no conforming layer of the invention was assumed as shown in FIG. 3 to be 1 (a bar chart declared by "without a surface layer" in a lower stage in FIG. 3), the shaft abrasion fraction was decreased to 0.53 when a resin (using polyamide imide as a base resin and using $MoS_2$ as a solid lubricant) having a thickness of 5 μm was coated on surfaces of the aluminum bearing alloy (a bar chart declared by "5 μm resin coating" in a middle stage in FIG. 3), and the shaft abrasion fraction was decreased to 0.27 when a Pb—Sn alloy having a thickness of 20 μm was plated on the aluminum bearing alloy (a bar chart declared by "20 μm electroplating" in an upper stage in FIG. 3). That is, shaft abrasion and scratching can be prevented by forming a conforming layer, which is formed from soft plating or resin coating, on surfaces of the aluminum bearing alloy for bearings.

DETAILED DESCRIPTION OF THE INVENTION

Figure 6:
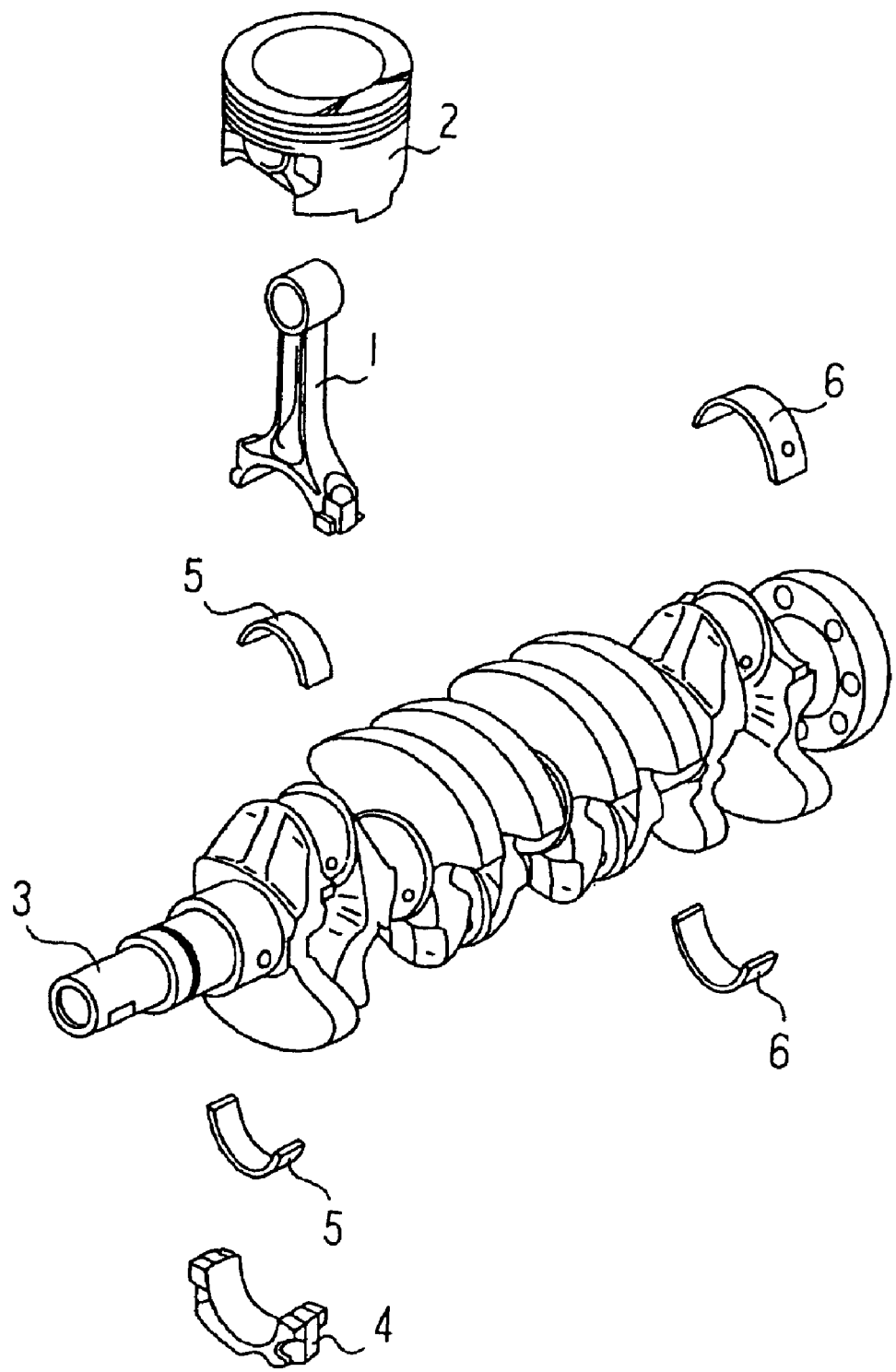
FIG. 6 is a perspective view showing the relationship between a crankshaft and bearings for internal combustion engines.

An embodiment of the invention will be described below in detail with reference to the drawings. FIG. 6 is a perspective view showing the relationship between a crankshaft and bearings for internal combustion engines, according to the invention.

In FIG. 6, connecting rod bodies 1 and pistons 2 are connected to each other by means of piston pins (not shown), and lower portions of the connecting rod bodies 1 are connected to a crankshaft 3. The connecting rod bodies 1 are connected to the crankshaft 3 such that the crankshaft 3 is interposed between the lower arcuate portions of the connecting rod bodies 1 and caps 4. Bearings 5 for the connecting rods, according to the invention, are fitted between the lower arcuate portions of the connecting rod bodies 1 and arcuate portions of the caps 4. Also, the crankshaft 3 is supported on a cylinder (not shown) through a main bearing 6. While the bearings 5, 6 bear the crankshaft 3 with oil film pressures when the crankshaft 3 rotates, the crankshaft 3 will come into contact with the bearings 5, 6 especially at the time of start-up and termination of rotation of the crankshaft 3 to wear the bearings 5, 6.

The crankshaft 3 is made of a steel material with a structure, which is mainly composed of pearlite having the pro-eutectoid ferrite fraction of at most 3%, is machined to have the surface roughness Rz of at most 0.8 µm.

Meanwhile, a method of manufacturing the bearings 5, 6 sliding on the crankshaft 3 comprises cutting a band-shaped bimetal, which is formed by bonding an aluminum bearing metal layer of Al—Sn—Si alloy to a steel back plate, to a predetermined dimension, bending the same into a semi-cylindrical shape, applying machining thereon, and thereafter covering the aluminum bearing metal layer with a conforming layer by means of Pb—Sn alloy plating or resin coating at need. Steel having a thickness of around 0.5 mm to 2 mm is used for the back plate according to the usage, the aluminum bearing metal layer having a thickness of around 0.3 mm to 0.5 mm is bonded to the back plate according to the usage, and the conforming layer has a thickness of 5 to 20 µm or thereabout.

Hereupon, with the bearings 5, 6 according to the embodiment, the aluminum bearing metal layer contains, as its alloy component, at least Si particles of less than 4 mass %, and is manufactured so that Si particles having the particle diameter of at most 4 µm have the area ratio of at least 60% relative to a total area of Si particles present on a sliding surface and the hardness of the aluminum bearing metal layer is at most a Vickers hardness of 70 and satisfies B≦(S/2−70) (B: Hv hardness of the aluminum bearing metal layer, S: Hv hardness of the crankshaft).

EXAMPLES

An explanation will be given to examples of crankshafts and aluminum bearings, which were manufactured according to the conditions described above. TABLE 5 shows crankshafts of Examples 1 to 6 having the pro-eutectoid ferrite fraction of at most 3% and the surface roughness Rz of at most 0.8 µm and crankshafts of Comparative examples 11 to 21 not meeting either or both of the above conditions, and an investigation was made on abrasion loss for combinations of aluminum bearings (bearings in Example 3 shown in the following TABLE 6) with the crankshafts of Examples 1 to 6 and the crankshafts of Comparative examples 11 to 21 under test conditions indicated in TABLE 3. And a comparison was made between the abrasion loss and abrasion loss generated in combinations of a conventional DCI shaft and bearings to calculate whether the both were equivalent to each other or not, results of which calculation are shown in Graph of FIG. 4.

TABLE 3

| Shaft abrasion test (1) | Condition |
| --- | --- |
| Peripheral speed | 15 m/s |
| Test load | 35 MPa |
| Test time | 20 hrs |
| Lubricating oil | VG68 |
| Lubrication temperature | 130° C. |
| Lubrication pressure | 0.4 MPa |
| Evaluation method | Shaft abrasion loss |

TABLE 5

| | No. | Pro-eutectoid ferrite fraction (%) | Roughness (Rz) |
| --- | --- | --- | --- |
| Example | 1 | 0.5 | 0.5 |
| | 2 | 0.5 | 0.8 |
| | 3 | 1.2 | 0.4 |
| | 4 | 1.2 | 0.5 |
| | 5 | 2.8 | 0.4 |
| | 6 | 2.8 | 0.7 |
| Comparative example | 11 | 1.2 | 1.3 |
| | 12 | 2.8 | 0.9 |
| | 13 | 3.8 | 0.8 |
| | 14 | 3.8 | 1 |
| | 15 | 6.8 | 0.5 |
| | 16 | 6.8 | 0.8 |
| | 17 | 7 | 1.2 |
| | 18 | 7 | 0.6 |
| | 19 | 12 | 0.5 |
| | 20 | 12 | 0.8 |
| | 21 | 12 | 1.2 |

Figure 1:
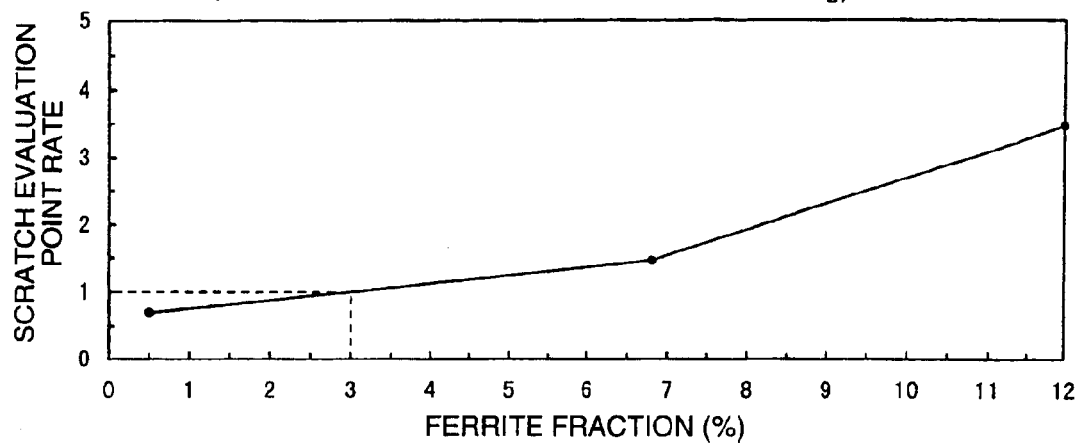
FIG. 1 is a graph showing the relationship between a ferrite fraction and a scratch evaluation point rate in a crankshaft according to an embodiment.
Figure 2:
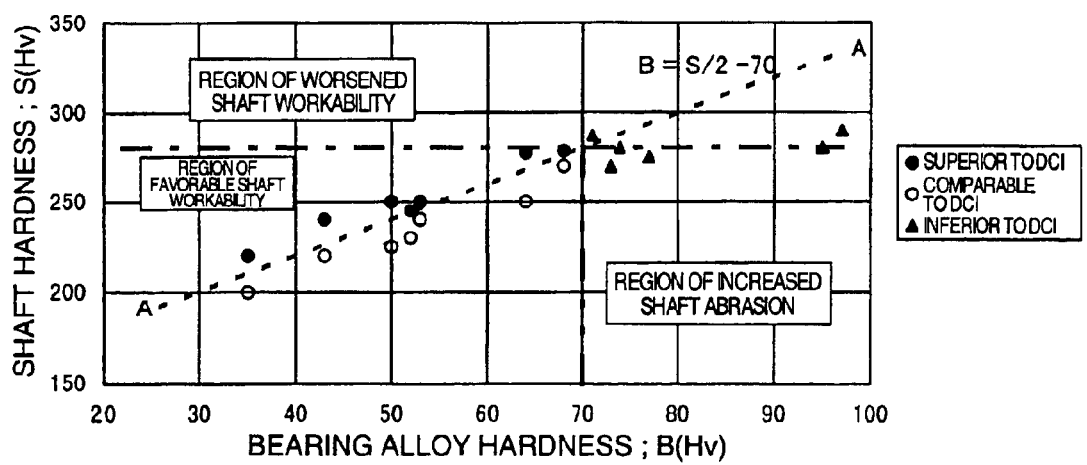
FIG. 2 is a graph showing the relationship among shaft hardness, bearing alloy hardness and shaft abrasion.
Figure 3:
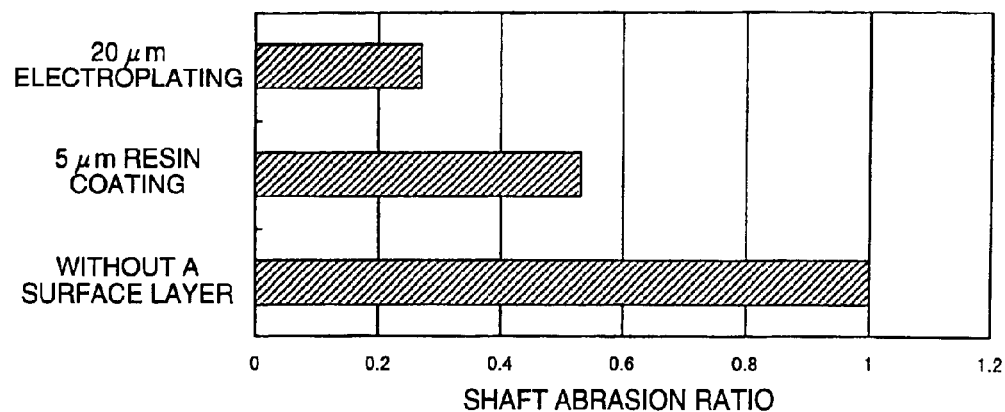
FIG. 3 is a graph showing a shaft abrasion fraction in the case where a conforming layer is formed on surfaces of a bearing alloy of a bearing and in the case where the layer is not formed.
Figure 4:
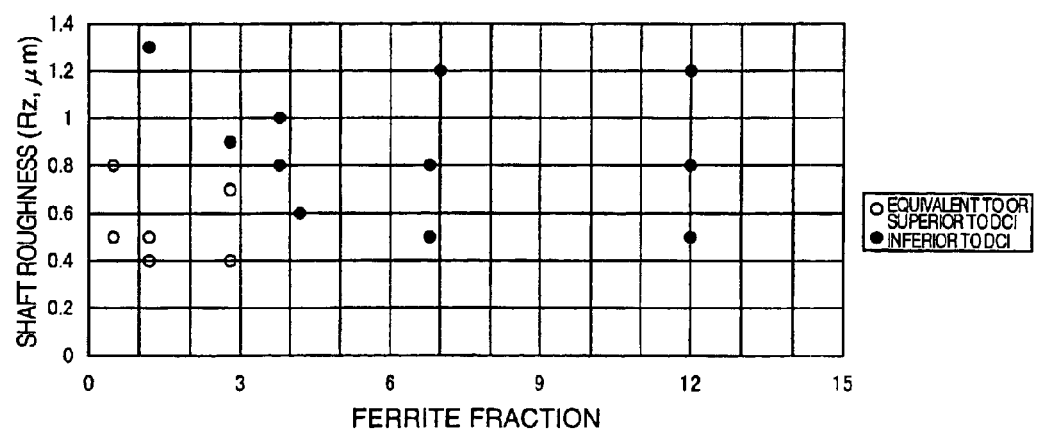
FIG. 4 is a graph showing whether the relationship between a ferrite fraction and a shaft roughness in crankshafts of Examples and Comparative examples makes a comparable comparison with shaft abrasion loss of conventional DCI shafts.

Then, when the ferrite fraction and the shaft surface roughness Rz in Examples 1 to 6 were plotted in corresponding positions in axes of abscissas and ordinate in Graph shown in FIG. 4, it has been found that all the results of calculation presented capabilities (small abrasion loss) equivalent to or more advantageous than the abrasion loss of the DCI shaft (plotted in "○"). When the ferrite fraction and the surface roughness Rz in Comparative examples 11 to 21, which did not meet either or both of two conditions, that is, the pro-eutectoid ferrite fraction of at most 3% and the surface roughness Rz of at most 0.8 µm, were plotted in corresponding positions in axes of abscissas and ordinate, however, it has been found that all the results of calculation presented capabilities (large abrasion loss) inferior to the abrasion loss of the DCI shaft (plotted in "●"). Accordingly, in order to possess capabilities equivalent to or more advantageous than those of conventional DCI shafts, crankshafts must meet two conditions, that is, the pro-eutectoid ferrite fraction of at most 3% and the surface roughness Rz of at most 0.8 µm.

Meanwhile, TABLE 6 shows aluminum bearings of Examples 1 to 7, which had a Si amount of less than 4 mass %, and in which Si particles having a particle diameter of at most 4 µm had the area ratio of at least 60% relative to a total area of Si particles present on a sliding surfaces, and the hardness of an aluminum bearing metal layer was at most a Vickers hardness of 70, and aluminum bearings of Comparative examples 11 to 19, which did not meet one or two or all of the above three conditions, and an investigation was made on shaft roughness variations for combinations of aluminum bearings in Examples 1 to 7 and aluminum bearings in Comparative examples 11 to 19 with a crankshaft (the crankshaft of Example 2 shown in the above TABLE 5) under test conditions indicated in TABLE 4. And a comparison was made between the shaft roughness variations and shaft roughness variations generated in combinations of a conventional DCI shaft and bearings to calculate whether the both were equivalent to each other or not, results of which calculation are shown in Graph of FIG. 5.

TABLE 4

| Shaft abrasion test (2) | Condition |
|---|---|
| Peripheral speed | 0 ↔→ 1.7 m/s |
| Test load | 4 MPa |
| Test time | 20 hrs (start-up - stoppage cycle 4 sec) |
| Lubricating oil | VG10 |
| Evaluation method | Change in irregular configuration of shaft surface |

TABLE 6

| | | Bearing alloy component (mass %) | | | Area ratio of Si particles of at most 4 μm(%) | Alloy hardness (Hv) | Shaft roughness variation rate |
|---|---|---|---|---|---|---|---|
| | No. | Si | Sn | Cu | | | |
| Example | 1 | 0.5 | 20 | 0.8 | 82 | 35 | 0.2 |
| | 2 | 0.9 | 20 | 2 | 78 | 50 | 0.4 |
| | 3 | 2.3 | 12 | 1 | 82 | 43 | 0.5 |
| | 4 | 2.5 | 10 | 1.4 | 72 | 64 | 0.64 |
| | 5 | 3.4 | 12 | 1 | 68 | 52 | 0.75 |
| | 6 | 3.8 | 8 | 1.5 | 65 | 53 | 0.9 |
| | 7 | 3.7 | 10 | 1.5 | 62 | 68 | 0.94 |
| Comparative example | 11 | 0.7 | 20 | 2 | 87 | 73 | 1.05 |
| | 12 | 2.3 | 10 | 1.5 | 43 | 71 | 1.8 |
| | 13 | 2.7 | 8 | 1.5 | 76 | 74 | 1.13 |
| | 14 | 3.2 | 12 | 1.8 | 57 | 77 | 2.1 |
| | 15 | 4.3 | 9 | 1.4 | 38 | 64 | 2.5 |
| | 16 | 5.5 | 10 | 0.8 | 70 | 50 | 1.6 |
| | 17 | 6 | — | 1.3 | 82 | 95 | 1.5 |
| | 18 | 6 | — | 1 | 43 | 55 | 2.5 |
| | 19 | 6 | — | 1.5 | 40 | 97 | 2.9 |

Figure 5:
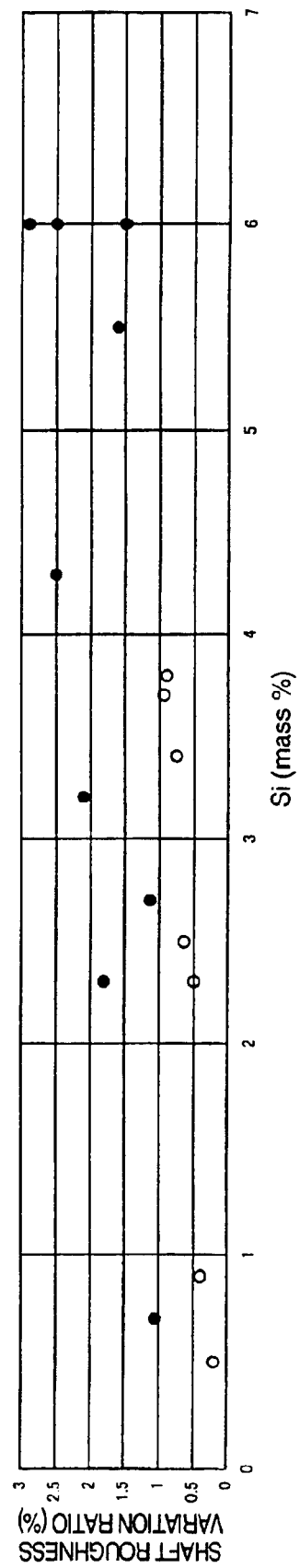
FIG. 5 is a graph showing whether the relationship between an amount of silicone and a shaft roughness variation in bearing alloys of Examples and Comparative examples makes a comparable comparison with a shaft roughness variation of conventional DCI shafts.

Then, when Si amounts and shaft roughness variations in Examples 1 to 7 were plotted in corresponding positions in axes of abscissas and ordinate in Graph shown in FIG. 5, it has been found that all the results of calculation presented capabilities (small variation) equivalent to or more advantageous than shaft roughness variation generated in the DCI shaft (plotted in "○"). When Si amounts and shaft roughness variations in Comparative examples 11 to 19, which did not meet one or two or all of three conditions, that is, a Si amount of less than 4 mass %, Si particles of a particle diameter of at most 4 μm having the area ratio of at least 60% relative to a total area of Si particles present on a sliding surfaces and the hardness of an aluminum bearing metal layer being at most a Vickers hardness of 70, were plotted in corresponding positions in axes of abscissas and ordinate, however, it has been found that all the results of calculation presented capabilities (large variation) inferior to the shaft roughness variation of the DCI shaft (plotted in "●"). Accordingly, in order to possess capabilities equivalent to or more advantageous than those of conventional DCI shafts, aluminum bearings must meet three conditions, that is, that a Si amount is less than 4 mass %, Si particles of particle diameter of at most 4 μm have the area ratio of at least 60% relative to a total area of Si particles present on a sliding surfaces, and the hardness of an aluminum bearing metal layer is at most a Vickers hardness of 70.

In addition, while bearing alloy components shown in TABLE 6 include Sn, Cu, and so on in addition to Si, it has been found from experimental results that other components than Si had little influence on shaft roughness variation.

As apparent from the above description, according to the invention, there can be provided a bearing device capable of ensuring reliability and productivity, which are equivalent to or more advantageous than those of conventional bearing devices, by a combination of a crankshaft made of steel having not been subjected to surface hardening and having a structure, which is mainly composed of pearlite having the pro-eutectoid ferrite fraction of at most 3%, and processed to have the surface roughness Rz of at most 0.8 μm, and bearings having an aluminum bearing alloy bonded to a back plate thereof and containing, as an alloy component thereof, at least Si particles of less than 4 mass %, among which Si particles having the particle diameter of at most 4 μm have the area ratio of at least 60% relative to a total area of Si particles present on a sliding surface, the bearings having the hardness of at most a Vickers hardness of 70 and satisfying [B≦(S/2−70) (B: Hv hardness of the aluminum bearing alloy, S: Vickers hardness of the crankshaft)].

What is claimed is:

1. A bearing device for internal combustion engines, comprising a crankshaft and a bearing supporting the crankshaft in an internal combustion engine, and
    wherein the crankshaft is made of steel having not been subjected to surface hardening and having a structure, which is mainly composed of pearlite having the pro-eutectoid ferrite fraction of at most 3%, and is processed to have the surface roughness Rz of at most 0.8 μm, and
    wherein the bearing has an aluminum bearing alloy bonded to a back plate thereof and contain, as an alloy component thereof, Si particles of less than 4 mass %.

2. The bearing device according to claim 1, wherein Si particles of the aluminum bearing alloy having the particle diameter of at most 4 μm have the area ratio of at least 60% relative to a total area of Si particles present on a sliding surface.

3. The bearing device according to claim 2, wherein the aluminum bearing alloy has a Vickers hardness of at most 70.

4. The bearing device according to claim 3, wherein the aluminum bearing alloy has a Vickers hardness to meet the following formula
    B≦(S/2−70) (B: Vickers hardness of the aluminum bearing alloy, S: Vickers hardness of the crankshaft).

5. The bearing device according to claim 4, wherein a softer conforming layer than the aluminum bearing alloy covers surfaces of the alloy.

6. The bearing device according to claim 3, wherein a softer conforming layer than the aluminum bearing alloy covers surfaces of the alloy.

7. The bearing device according to claim 2, wherein the aluminum bearing alloy has a Vickers hardness to meet the following formula
    B≦(S/2−70) (B: Vickers hardness of the aluminum bearing alloy, S: Vickers hardness of the crankshaft).

8. The bearing device according to claim 7, wherein a softer conforming layer than the aluminum bearing alloy covers surfaces of the alloy.

9. The bearing device according to claim 2, wherein a softer conforming layer than the aluminum bearing alloy covers surfaces of the alloy.

10. The bearing device according to claim 9, wherein the conforming layer is formed by plating or resin coating.

11. The bearing device according to claim 1, wherein the aluminum bearing alloy has a Vickers hardness of at most 70.

12. The bearing device according to claim 11, wherein the aluminum bearing alloy has a Vickers hardness to meet the following formula $B \leqq (S/2-70)$ (B: Vickers hardness of the aluminum bearing alloy, S: Vickers hardness of the crankshaft).

13. The bearing device according to claim 12, wherein a softer conforming layer than the aluminum bearing alloy covers surfaces of the alloy.

14. The bearing device according to claim 11, wherein a softer conforming layer than the aluminum bearing alloy covers surfaces of the alloy.

15. The bearing device according to claim 14, wherein the conforming layer is formed by plating or resin coating.

16. The bearing device according to claim 1, wherein the aluminum bearing alloy has a Vickers hardness to meet the following formula $B \leqq (S/2-70)$ (B: Vickers hardness of the aluminum bearing alloy, S: Vickers hardness of the crankshaft).

17. The bearing device according to claim 16, wherein a softer conforming layer than the aluminum bearing alloy covers surfaces of the alloy.

18. The bearing device according to claim 17, wherein the conforming layer is formed by plating or resin coating.

19. The bearing device according to claim 1, wherein a softer conforming layer than the aluminum bearing alloy covers surfaces of the alloy.

20. The bearing device according to claim 19, wherein the conforming layer is formed by plating or resin coating.

* * * * *